United States Patent
Asano

(10) Patent No.: US 9,121,733 B2
(45) Date of Patent: Sep. 1, 2015

(54) POSITION DETECTING APPARATUS, AND LENS APPARATUS, IMAGE READING APPARATUS, AND IMAGE FORMING APPARATUS INCLUDING THE SAME

(71) Applicant: CANON KABUSHIKI KAISHA, Tokyo (JP)

(72) Inventor: Takurou Asano, Kawachi-gun (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/471,724

(22) Filed: Aug. 28, 2014

(65) Prior Publication Data
US 2015/0062661 A1    Mar. 5, 2015

(30) Foreign Application Priority Data
Aug. 29, 2013 (JP) ................. 2013-177548

(51) Int. Cl.
*H04N 1/04* (2006.01)
*G01D 5/347* (2006.01)
*H04N 1/00* (2006.01)

(52) U.S. Cl.
CPC ........ *G01D 5/34707* (2013.01); *G01D 5/34746* (2013.01); *H04N 1/00013* (2013.01); *H04N 1/00015* (2013.01); *H04N 1/00037* (2013.01); *H04N 1/00045* (2013.01)

(58) Field of Classification Search
CPC .......... H04N 1/00013; H04N 1/00015; H04N 1/00037; H04N 1/00045
USPC ................. 358/1.9, 406, 1.13, 1.15
See application file for complete search history.

(56) References Cited

U.S. PATENT DOCUMENTS

| 8,309,906 | B2 * | 11/2012 | Kapner et al. | ............ 250/231.16 |
| 8,918,005 | B2 * | 12/2014 | Ogata et al. | ..................... 399/74 |
| 2012/0262731 | A1 | 10/2012 | Nagura | |

FOREIGN PATENT DOCUMENTS

JP        2012220458 A    11/2012

* cited by examiner

*Primary Examiner* — Houshang Safaipour
(74) *Attorney, Agent, or Firm* — Rossi, Kimms & McDowell LLP

(57) ABSTRACT

A position detector, includes: a scale having first and second patterns having respective first and second period; a detector array including elements each detecting energy intensities based on the patterns; a generator configured to generate first and second signals having phases different from each other obtained based on the patterns respectively; and a deriver deriving a position of the array relative to the scale based on the signals, wherein the scale is movable relative to the array; the deriver derives a reference position as a detection element array position relative to the scale based on the signals, performs a first process to derive a array position relative to the scale by a array displacement relative to the reference position is derived based on the first signals, and performs a second process in which a relative array position is derived based on the position derived by the first process.

11 Claims, 11 Drawing Sheets

POSITION DETECTING APPARATUS, AND LENS APPARATUS, IMAGE READING APPARATUS, AND IMAGE FORMING APPARATUS INCLUDING THE SAME

BACKGROUND OF THE INVENTION

1. Field of the Invention

The present invention relates to a position detecting apparatus, and more particularly, to a position detecting apparatus for a movable optical member such as a zoom lens, a focus lens, or an iris of a lens apparatus, or a position detecting apparatus for a movable optical member within a scanning optical apparatus such as an image reading apparatus or an image forming apparatus, and to a lens apparatus, an image reading apparatus, and an image forming apparatus that include the position detecting apparatus.

2. Description of the Related Art

At present, controllability of very high-precision is required for robot control, lens control for a camera, and the like. In order to realize this controllability, a high-precision and small position detecting apparatus is required.

In Japanese Patent Application Laid-Open No. 2012-220458, there is proposed a position detecting apparatus configured to use patterns having a plurality of different spatial modulation periods and a detection element array arranged in a movement detection direction to obtain the phase of each of a plurality of modulation signals, to thereby calculate the position. The use of this position detecting apparatus enables high-precision position detection.

In the related art disclosed in Japanese Patent Application Laid-Open No. 2012-220458, signals output from the detection element array are separated from a plurality of different modulation signals into specific modulation signals by using the principles of a spatial filter. However, with the spatial filter, the perfect separation cannot be carried out. Thus, when a desired modulation signal is intended to be obtained, other modulation signal components remain to distort a signal waveform. As a result, position detection precision is reduced.

SUMMARY OF THE INVENTION

In light of the foregoing, it is therefore an object of the present invention to provide a position detecting apparatus which is capable of carrying out position detection with high precision in order to obtain position information by separating and obtaining a plurality of modulation signals from a detection element array.

According to one embodiment of the present invention, there is provided a position detecting apparatus, including: a scale having a first pattern arranged in a predetermined direction at a first period and a second pattern arranged in the predetermined direction at a second period larger than the first period; a detection element array having a plurality of detecting elements, each of detecting elements being arranged in the predetermined direction and detecting energy intensities based on the first pattern and the second pattern; a generator configured to generate, based on detection signal output from the detection element array, a plurality of first signals having phases different from each other obtained based on the first pattern and a plurality of second signals having phases different from each other obtained based on the second pattern; and a deriving unit configured to derive a position of the detection element array relative to the scale based on the plurality of first signals and the plurality of second signals, wherein the scale is relatively movable in the predetermined direction relative to the detection element array, wherein the deriving unit derives a reference position as a position of the detection element array relative to the scale based on the plurality of first signals and the plurality of second signals, then performs a first process in which a displacement amount of the detection element array, which relatively moved, relative to the reference position is derived based on the plurality of first signals to derive a position of the detection element array relative to the scale and then performs a second process in which a position of the detection element array relative to the scale is derived based on the position derived by the first process.

According to one embodiment of the present invention, it is possible to provide the position detecting apparatus which is capable of carrying out position detection with high precision.

Further features of the present invention will become apparent from the following description of exemplary embodiments with reference to the attached drawings.

BRIEF DESCRIPTION OF THE DRAWINGS

FIG. 28 is a cross-sectional view of the sensor of the first and second embodiments.

DESCRIPTION OF THE EMBODIMENTS

Now, exemplary embodiments of the present invention are described in detail with reference to the accompanying drawings.

First Embodiment

A position detecting apparatus according to a first embodiment of the present invention is described below with reference to FIGS. 1 to 10.

Figure 1:
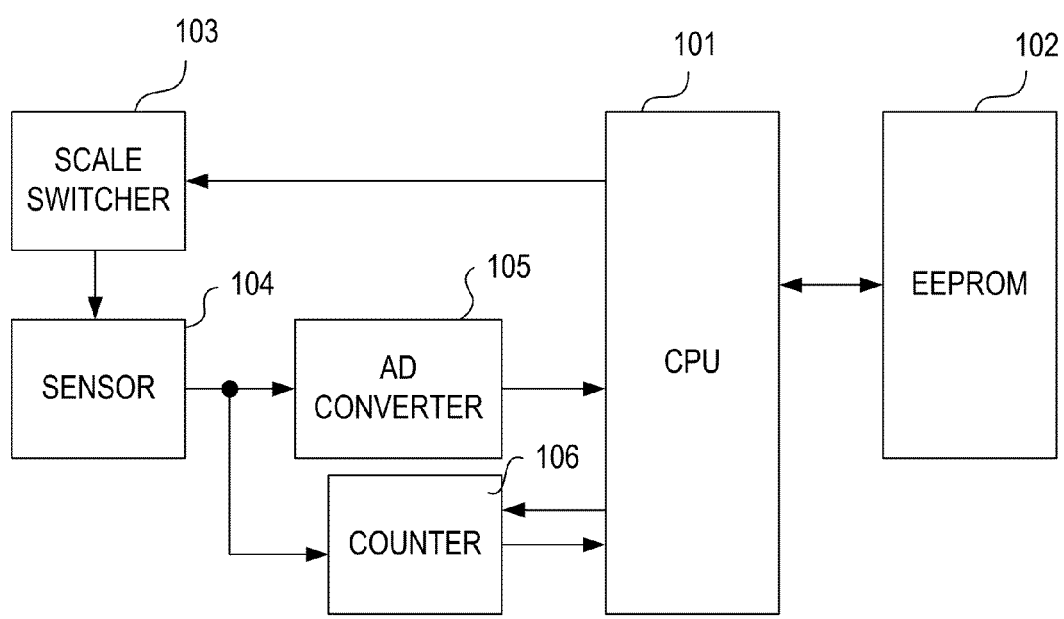
FIG. 1 is a block diagram illustrating a configuration of a position detecting apparatus according to first and second embodiments of the present invention.

FIG. 1 is a block diagram illustrating a configuration of the position detecting apparatus according to the first embodiment of the present invention. In FIG. 1, a CPU (deriving unit) 101 is a calculator section for calculating a displacement amount (hereinafter referred to as a position X) of a moving member (second member) with respect to a fixed member (first member) from a predetermined reference position based on a signal output from a sensor 104 by executing processing to be described later. An EEPROM 102 is a storage section for storing parameters necessary for correction processing to be described later. A scale switcher 103 is a scale switcher for switching two kinds of signal outputs generated from two kinds of track patterns and are successively output from the sensor 104, and outputting the signal output selected through the switching. The sensor 104 is a position sensor for outputting a signal used to calculate the position X of the moving member with respect to the fixed member. An internal structure of and an output signal (detection signal) from the sensor 104 are described later. An AD converter 105 is a converter for converting an analog signal output from the sensor 104 into a digital signal. A counter 106 is a counter for counting the number of periods of the output signal (detection signal) from the sensor 104. The counter 106 outputs a counter value indicating what number of a period of a first track pattern 203a, which is described later, from a position reset-instructed by the CPU 101.

Figure 2A:
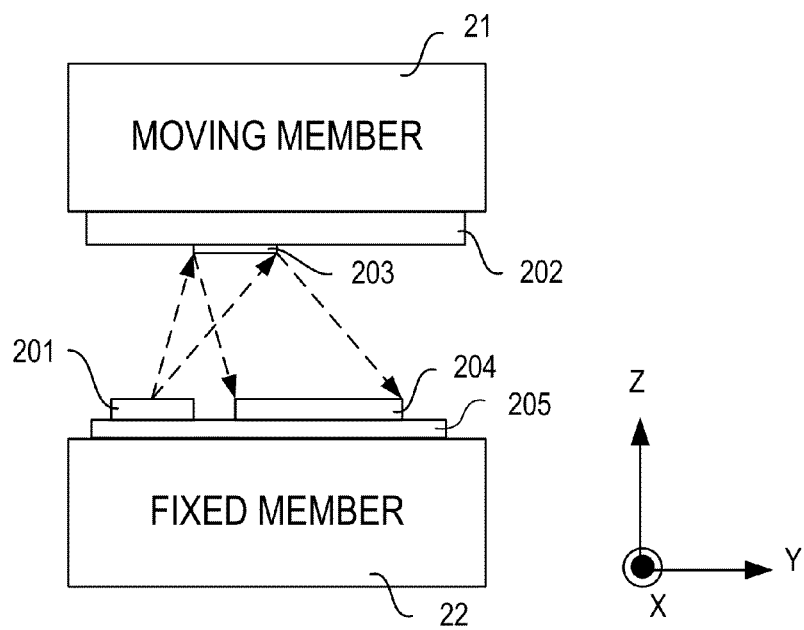
FIG. 2A is a cross-sectional view of a sensor of the first and second embodiments.
Figure 2B:
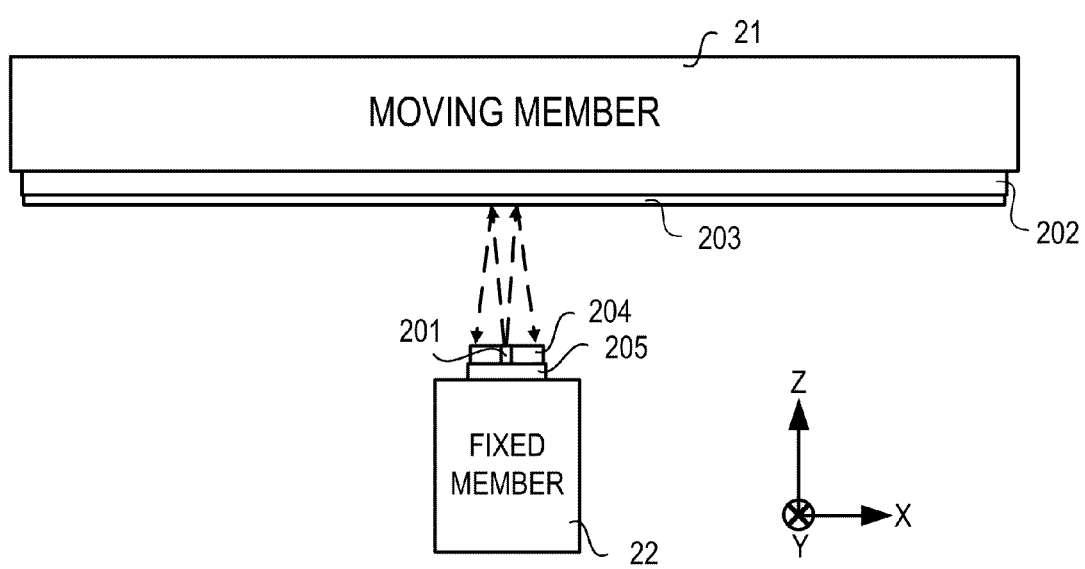

Next, the internal structure of and the output signal (detection signal) from the sensor 104 are described. FIGS. 2A and 2B are cross-sectional views illustrating the internal structure of the sensor 104. When a movement direction of a moving member 21 with respect to a fixed member 22 is an X direction, a direction in which the moving member 21 and the fixed member 22 are arranged is a Z direction, and a direction perpendicular to the X direction and the Z direction is a Y direction, FIG. 2A is a YZ cross-sectional view, and FIG. 28 is an XZ cross-sectional view. In FIG. 2A, the moving member 21 is a moving section configured to move in the X-axis direction corresponding to a direction perpendicular to the plane of the paper. The fixing member 22 is a member which becomes a reference of the position of the moving member 21. A light source 201 is a light emitting section and, for example, is an LED. A scale section (scale) 202 is a scale section having two track patterns (the first track pattern 203a and a second track pattern 203b) which are each formed at equal pitches but are different in the number of slits in a total length in the movement direction. A photo sensor (detection element array) 204 is a photo sensor for receiving light which is emitted from the light source 201 and is then reflected by the first track pattern 203a and the second track pattern 203b, and, for example, includes a photo diode array. The scale section 202 is configured to be movable with respect to the photo sensor 204 in a predetermined direction. In other words, either the scale section 202 or the photo sensor 204 can be movably installed. However, according to the present embodiment, the light source 201 and the photo sensor 204 are structured so as to be mutually immovable on the same plane which faces in parallel with the scale section 202. A signal processing circuit (generator) 205 is a signal processing circuit for processing the signal received by the photo sensor 204, and outputting the signal corresponding to any one of the track patterns 203a and 203b in accordance with the switching signal from the scale switcher 103. Note that, in the first embodiment, the structure has been exemplified, in which the scale section 202 is fixed to the moving member 21, and the fixed member 22 includes the light source 201 and the photo sensor 204. However, the present invention is by no means limited to that structure. Alternatively, one of the fixed member 22 and the moving member 21 may include the scale section 202, and the other may include the light source 201 and the photo sensor 204.

Figure 3:
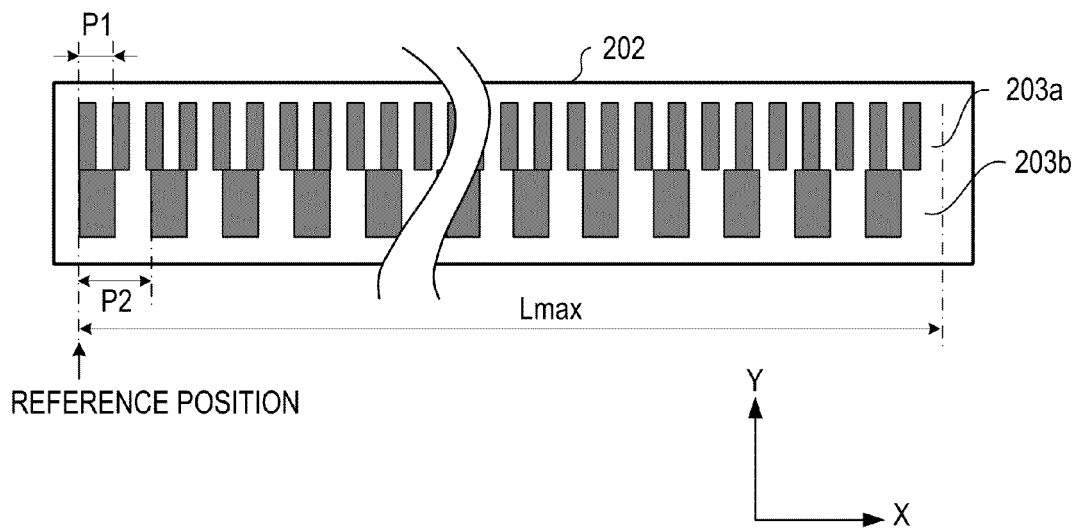
FIG. 3 is a top plan view of a scale of the first and second embodiments.

FIG. 3 is a top plan view of the scale section 202 in the first embodiment. In FIG. 3, a reflective slit pattern (reflective pattern) is illustrated as an example. The scale section 202 includes the two track patterns (pattern): the first track pattern 203a; and the second track pattern 203b. Reflection sections (blackened sections) of each of the first and second track patterns 203a and 203b are structured so as to reflect the light from the light source 201, and the photo sensor 204 is structured so as to receive the reflected light. The reflection sections of the first track pattern 203a are formed at equal pitches (first period) P1 in the movement direction (in the X direction). Similarly, the reflection sections of the second track pattern 203b are formed at equal pitches (second period) P2 in the movement direction (in the X direction). In the first embodiment, P1 is 100 μm, P2 is 201 μm, and a total length Lmax of the scale is 20,100 μm. For this reason, 201 reflection sections of the first track pattern 203a are structured for the total length Lmax, and 100 reflection sections of the second track pattern 203b are structured for the total length Lmax. Note that, in each of the first track pattern and the second track pattern which are used in the first embodiment, the reflection section is started from one of end positions, which serves as the reference position for the position X (the phase is 0).

Figure 4:
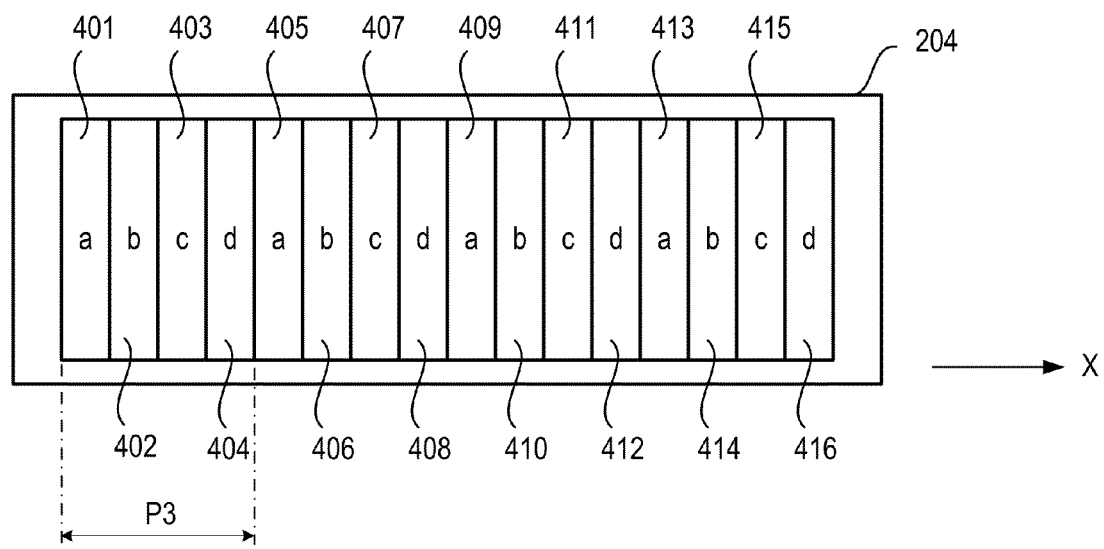
FIG. 4 is a diagram illustrating arrangement of phases a to d of a photo sensor at a time of detection of a first track pattern.

FIG. 4 is a top plan view of the photo sensor 204. In the photo sensor 204, 16 photo diodes 401 to 416 are arranged at equal pitches in the X-axis direction (in the movement direction of the moving member) (which construct a detection element array and a light receiver array). A width (sensor width) P3 for four photo diodes is set to 200 μm which is twice as large as P1. In the first embodiment, however, due to a manufacturing error or the like, the sensor width P3 has an error of about ±1 μm from 200 μm. A distance on an optical path from the light source 201 to the photo sensor 204 is twice a distance from the light source 201 to each of the reflection sections of the first and second track patterns 203a and 203b. Therefore, a width and a length of the light which is emitted from the light source to be received by the photo sensor 204 after reflected by the reflection section become double as large as a width and a length of the reflection section. Therefore, the sensor width P3 (200 μm) within the photo sensor 204 corresponds to a width (100 μm) for one period of the first track pattern 203a.

When the first track pattern 203a is selected by the scale switcher 103, the signal processing circuit 205, as illustrated in FIG. 4, sets the photo diodes 401, 405, 409, and 413 to have a phase-a, and adds the signals detected by the photo diodes 401, 405, 409, and 413 to one another to produce a phase-a signal. Likewise, a phase-b signal is produced from the photo diodes 402, 406, 410, and 414, and a phase-c signal is produced from the photo diodes 403, 407, 411, and 415. Further, a phase-d signal is produced from the photo diodes 404, 408, 412, and 416. In addition, the signal processing circuit 205 produces a phase-A signal S1a, which is obtained by converting a difference component between the phase-a signal and the phase-c signal into a voltage by a differential amplifier (not shown). Further, the signal processing circuit 205 produces a phase-B signal S1b which is obtained by converting a difference component between the phase-b signal and the phase-d signal into a voltage by the differential amplifier.

Then, the signal processing circuit 205 outputs the resulting two voltage signals (the phase-A signal S1a and the phase-B signal S1b) to the AD converter 105.

Figure 5:
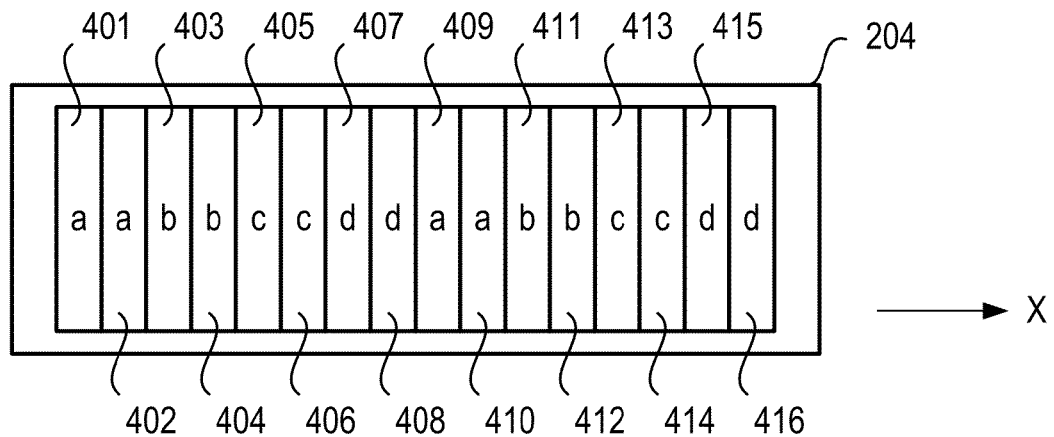
FIG. 5 is a diagram illustrating arrangement of the phases a to d of the photo sensor at a time of detection of a second track pattern.

On the other hand, when the second track pattern 203b is selected by the scale switcher 103, the signal processing circuit 205, as illustrated in FIG. 5, sets the photo diodes 401, 402, 409, and 410 to have a phase-a, and adds the signals detected by the photo diodes 401, 402, 409, and 410 to one another to produce a phase-a signal. Likewise, a phase-b signal is produced from the photo diodes 403, 404, 411, and 412, and a phase-c signal is produced from the photo diodes 405, 406, 413, and 414. Further, a phase-d signal is produced from the photo diodes 407, 408, 415, and 416. Then, the signal processing circuit 205 produces a phase-A signal S2a which is obtained by converting a difference component between the phase-a signal and the phase-c signal into a voltage by the differential amplifier. Further, the signal processing circuit 205 produces a phase-B signal S2b which is obtained by converting a difference component between the phase-b signal and the phase-d signal into a voltage by the differential amplifier. Then, the signal processing circuit 205 outputs the resulting two voltage signals (the phase-A signal S2a and the phase-B signal S2b) to the AD converter 105.

Producing the signals in the manner as described above results in that, by the principles of the spatial filter, the first track phase-A signal S1a and the first track phase-B signal S1b (a plurality of signals having the first period) become signals corresponding to the period P1 of the first track pattern 203a with their phases shifted by $\pi/2$ from each other. Likewise, the second track phase-A signal S2a and the second track phase-B signal S2b become signals corresponding to the period P2 of the second track pattern 203b with their phases shifted by $\pi/2$ from each other. In the present invention, however, the period (201 μm) of the second track pattern 203b does not match the sensor width P3 (200 μm) (the width for four photo diodes), and in addition thereto, it is allowed that the sensor width P3 includes the error of about ±1 μm. Therefore, the separation characteristics of the spatial filter become slightly worse. For this reason, the signal having the period P2 remains in the first track phase-A signal S1a and the first track phase-B signal S1b, and the signal having the period P1 remains in the second track phase-A signal S2a and the second track phase-B signal S2b.

Figure 6:
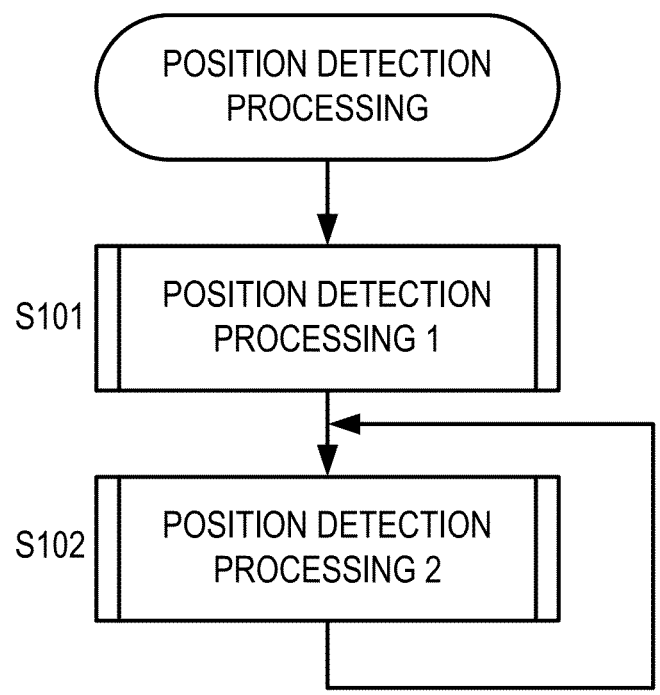
FIG. 6 is a flow chart of whole processing in a CPU of the first and second embodiments.

Subsequently, processing by the CPU 101 is described. FIG. 6 is a flow chart illustrating whole position detection processing executed by the CPU 101. The processing is roughly divided into two parts. Immediately after a power source is turned ON, position detection processing 1 to be described later is executed, and thereafter, position detection processing 2 to be described later is executed so as to follow the position detection processing 1.

Figure 7:
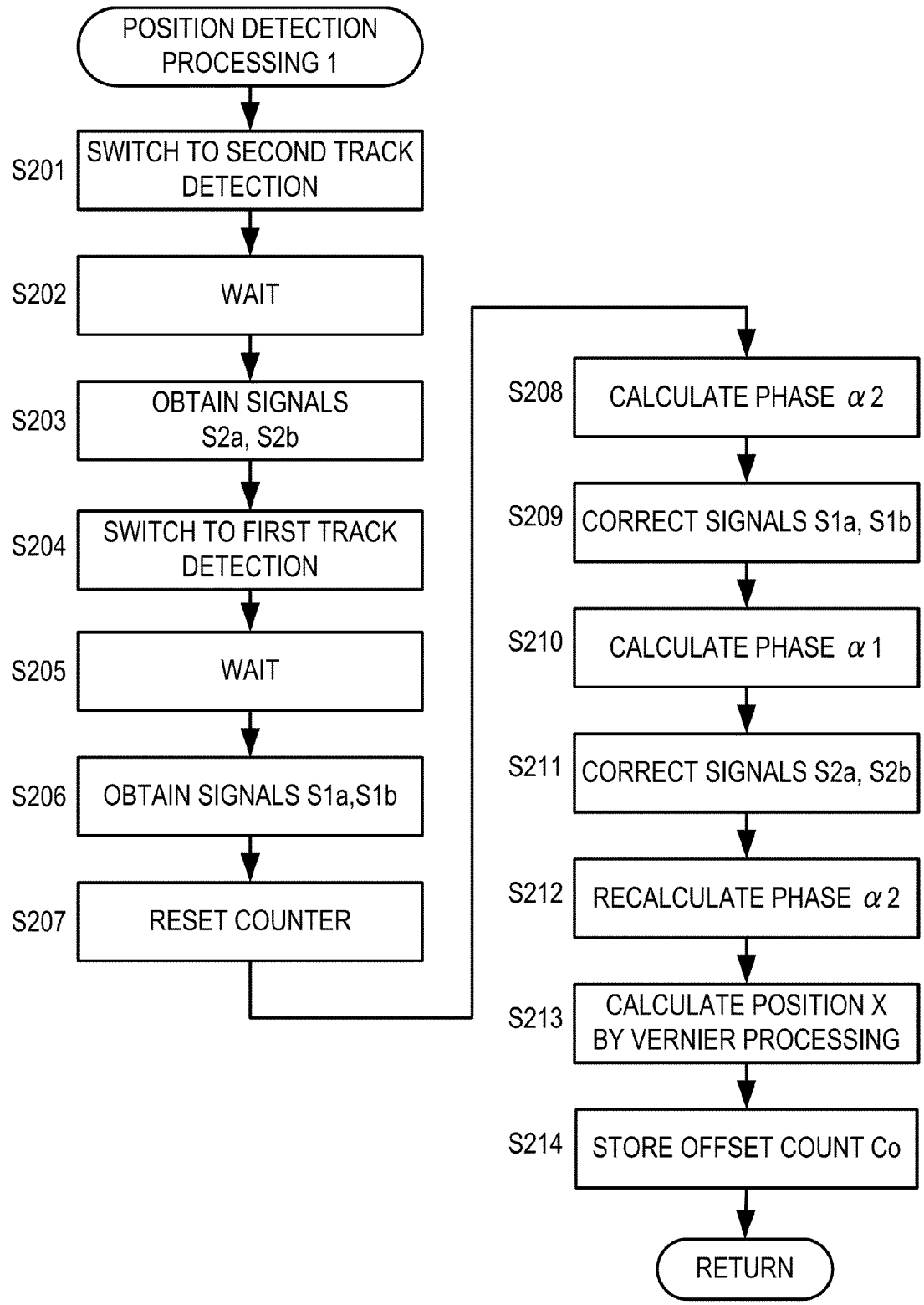
FIG. 7 is a flow chart of position detection processing 1 of the first and second embodiments.

The position detection processing 1 is now described. FIG. 7 is a flow chart illustrating the position detection processing 1. First of all, in Step S201, an instruction is issued to the scale switcher 103 so that the second track phase-A signal S2a and the second track phase-B signal S2b are detected, and in Step S202, the processing waits until the switching signal is stabilized. A waiting time is a fixed value determined depending on a configuration of a filter of a signal output circuit (not shown), and is set as 20 μs in the first embodiment. Next, in Step S203, the second track phase-A signal S2a and the second track phase-B signal S2b are obtained from the AD converter 105. In Steps S204 to S206, similarly to Steps S201 to S203, the first track phase-A signal S1a and the first track phase-B signal S1b are obtained. In Step S207, a counter value C of the counter 106 is reset to 0.

In Step S208, a phase $\alpha 2$ of the second track (second phase information) is calculated by using the second track phase-A signal S2a and the second track phase-B signal S2b which are obtained in Step S203. A method of calculating the phase $\alpha 2$ is a general calculation method using arctan calculation, and thus is omitted here.

Subsequently, in Step S209, the first track phase-A signal S1a and the first track phase-B signal S1b are corrected by Expressions (1) and (2):

$$S1A = S1a - \eta a12 \times \cos(\alpha 2 + \gamma a12) \quad (1)$$

$$S1B = S1b - \rho b12 \times \cos(\alpha 2 + \gamma b12) \quad (2)$$

where S1A and S1B are the first track phase-A signal and the first track phase-B signal after the correction, respectively, $\eta a12$ and $\eta b12$ are first track phase-A correction amplitude and first track phase-B correction amplitude, respectively, and $\gamma a12$ and $\gamma b12$ are a first track phase-A correction phase and a first track phase-B correction phase, respectively. The correction performed here is correction for removing the second track signals which have not been perfectly separated by the principles of the spatial filter described above from the first track phase-A signal and the first track phase-B signal. $\eta a12$, $\eta b12$, $\gamma a12$, and $\gamma b12$ are parameters which are obtained from the separation characteristics of the spatial filter, and are measured and calculated in advance to be stored in the EEPROM 102 in the first embodiment. With regard to the measurement and calculation methods, S1a, S1b, S2a, and S2b are measured in a plurality of positions, and are subjected to frequency separation by Fourier transform, and the response characteristics are calculated to calculate $\eta a12$, $\eta b12$, $\gamma a12$, and $\gamma b12$.

Note that, although in the first embodiment, $\eta a12$, $\eta b12$, $\gamma a12$, and $\gamma b12$ are obtained through the measurement and the calculation, when the separation characteristics of the spatial filter are determined, $\eta a12$, $\eta b12$, $\gamma a12$, and $\gamma b12$ may be theoretically obtained to be stored as fixed values.

In Step S210, the phase $\alpha 1$ of the first track is calculated by using a general calculation method using the arctan calculation similarly to the case of Step S208, and by using the first track phase-A signal S1A and the first track phase-B signal S1B after the correction.

Similarly to Step S209, in Step S211, the second track phase-A signal S2a and the second track phase-B signal S2b are corrected by Expressions (3) and (4):

$$S2A = S2a - \eta a21 \times \cos(\alpha 1 + \gamma a21) \quad (3)$$

$$S2B = S2b - \eta b21 \times \cos(\alpha 1 + \gamma b21) \quad (4)$$

where S2A and S2B are the second track phase-A signal and the second track phase-B signal after the correction, respectively, $\eta a21$ and $\eta b21$ are second track phase-A correction amplitude and second track phase-B correction amplitude, respectively, and $\gamma a21$ and $\gamma b21$ are a second track phase-A correction phase and a second track phase-B correction phase, respectively. The correction performed here is correction for removing the first track signals which have not been perfectly separated by the principles of the spatial filter described above from the second track phase-A signal and the second track phase-B signal.

In Step S212, the phase $\alpha 2$ of the second track is calculated and updated again by using the same method as that in Step S208, and by using the second track phase-A signal S2A and the second track phase-B signal S2B after the correction. In Step S213, the position X is calculated by using the phase $\alpha 1$ calculated in Step S210 and the phase $\alpha 2$ calculated in Step S212. In the first embodiment, the pitch P1 of the first track is 100 μm, and the pitch P2 of the second track is 200 μm. Therefore, there is only one position where the phase α1 and the phase α2 show a specific combination within the total length Lmax of 20,100 μm. For this reason, a general Vernier calculation is carried out based on the phase α1 and the phase α2, to thereby enable the position X to be calculated. In general, the Vernier calculation is carried out to enable the position X to be calculated as long as a combination is obtained in which a length of the least common multiple (or the least common multiple or less) of the pitch (period) P1 of the first track and the pitch (period) P2 of the second track is the total length Lmax. The details of the Vernier calculation are omitted here because the Vernier calculation is the general calculation method. Note that, the position X is expressed in terms of a value in which a length from the reference position is shown in units of μm.

In Step S214, an offset count Co is calculated. The offset count Co is a value showing what number of the period of the first track pattern the position X calculated in Step S213 is from the reference position, and is expressed in terms of the quotient obtained by dividing the position X by 100 μm.

Figure 8:
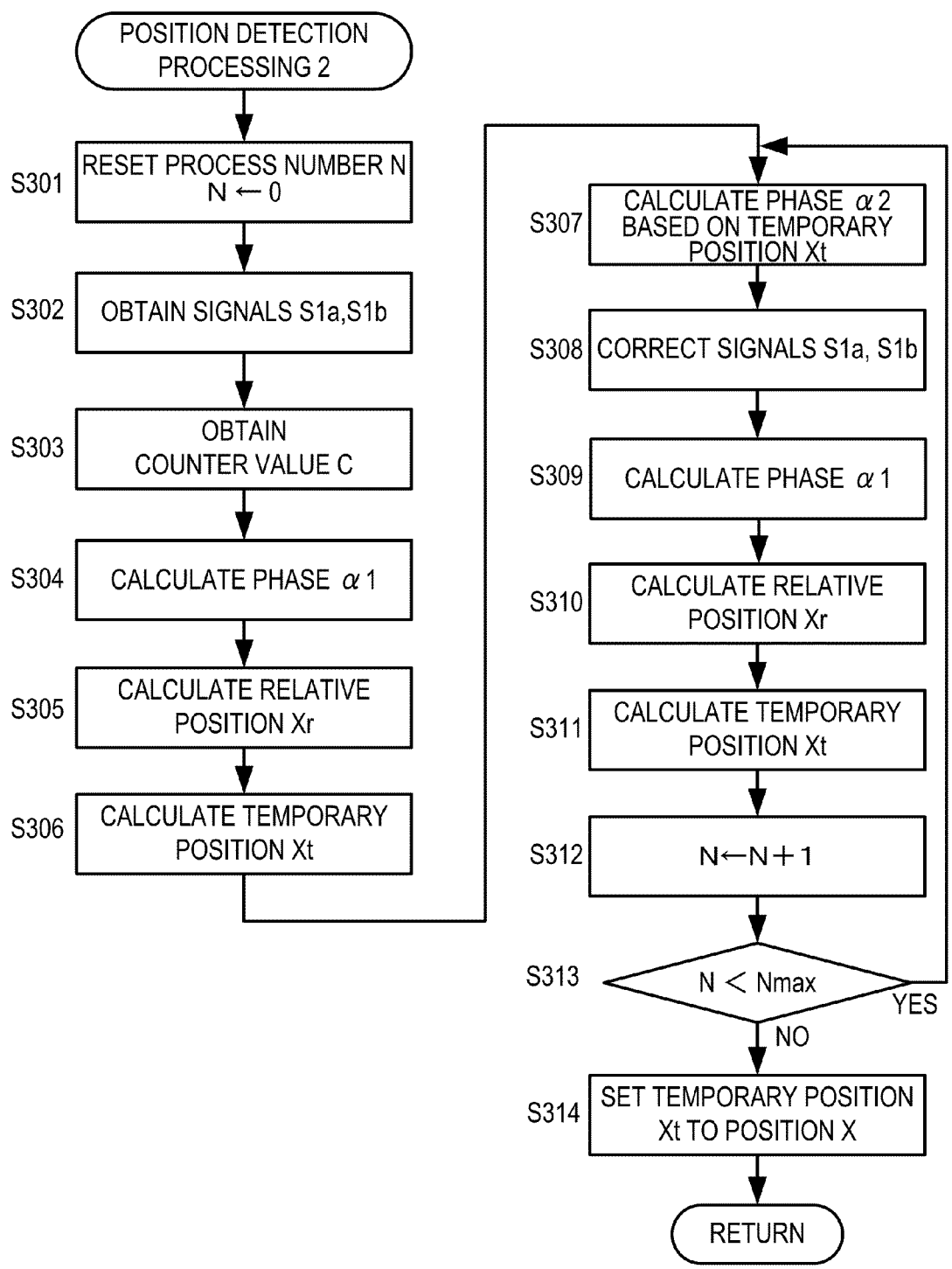
FIG. 8 is a flow chart of position detection processing 2 of the first embodiment.

Next, the position detection processing 2 is now described. FIG. 8 is a flow chart illustrating the position detection processing 2. Hereinafter, processes from Step S301 to Step S306 are referred to as "first process" and processes from Step S307 to Step S313 are referred to as "second process". The first process is described first.

First of all, in Step S301, the process number N is reset to 0. In Step S302, the first track phase-A signal S1a and the first track phase-B signal S1b are obtained from the AD converter 105. The position detection processing 2 is processing which is repetitively executed after the position detection processing 1 which is executed immediately after the power source is turned ON. At a time of end of the position detection processing 1, the scale switcher 103 switches the second track pattern over to the first track pattern. Thus, as described thereafter, because no track pattern is switched within the position detection processing 2, the first track phase-A signal S1a and the first track phase-B signal S1b can be obtained without executing the track switching processing.

Subsequently, in Step S303, the counter value C is obtained from the counter 106. In Step S304, the phase α1 is calculated similarly to the case of Step S210 by using the first track phase-A signal S1a and the first track phase-B signal S1b which are obtained in Step S302. In Step S305, a relative position (displacement amount of the photo sensor relative to the reference position described later) Xr with respect to a counter reset position is calculated by using Expression (5), and by using the counter value C thus obtained and the phase α1 thus calculated:

$$Xr = 100 \times C + 100 \times \alpha1/2\pi \qquad (5)$$

In Step S306, a temporary position (position of the photo sensor relative to the scale section) Xt is calculated by using Expression (6) based on the relative position Xr, and the reference position (100×Co) calculated by using the offset count Co stored in Step S204:

$$Xt = Xr + 100 \times Co \qquad (6)$$

The reference position is the position of the photo sensor relative to the scale section.

The temporary position Xt is obtained as follows. A side end of the reference position within the period of the first track pattern where the position X at a time point obtained in Step S213 is present is set as the reference position (100×Co). Then, the relative position Xr as a relative movement amount (displacement amount) from the reference position (100×Co) is added to the reference position (100×Co), to thereby obtain the temporary position Xt. Therefore, the temporary position Xt is a value close to the actual position X. However, because the temporary position Xt is the value which is calculated by using the first track phase-A signal S1a and the first track phase-B signal S1b which are not yet corrected, the temporary position Xt is slightly shifted from the actual position X.

Next, the second process is described. in Step S307, the phase α2 (the phase α2 in the second period) is calculated from the temporary position Xt. In this case, the phase α2 is calculated by using Expression (7) without using the second track phase-A signal S2a and the second track phase-B signal S2b:

$$\alpha2 = 2\pi \times \mathrm{mod}(Xt, 201)/201 \qquad (7)$$

where a function mod(x, y) expresses the surplus obtained by dividing x by y. In this case, a ratio of the surplus obtained by dividing the temporary position Xt by the second track pattern pitch P2 (201 μm) to the second track pattern pitch P2 is determined, and the surplus is multiplied by 2π, to thereby calculate the phase α2. In the first embodiment, the position where the position X is 0 is set as the reference position, and the second track pattern is set in such a way that the phase α2 becomes 0 in the reference position. Therefore, the phase α2 can be calculated as expressed in Expression (7). However, when the position X is 0, the phase α2 may be Δα other than 0. In this case, the phase concerned is calculated by using Expression (8):

$$\alpha2\_2 = \mathrm{mod}(\alpha2 + \Delta\alpha, 2\pi) \qquad (8)$$

Processing of Steps S308 and S309 is the same as the processing of Steps S209 and S210. Thus, the first track phase-A signal S1a and the first track phase-B signal S1b are corrected, to thereby calculate the phase α1. In addition, in processing of Steps S310 and S311, similarly to the case of the processing of Steps S305 and S306, the relative position (displacement amount of the photo sensor relative to the reference position described later) Xr and the temporary position (position of the photo sensor relative to the scale section) Xt are calculated again by using the phase α1 calculated in Step S309.

In Step S312, the process number N is incremented, and it is determined in Step S313 whether or not the process number N is smaller than the maximum process number Nmax. When it is determined that the process number N is smaller than the maximum process number Nmax, the processing of Steps S307 to S312 (second process) is repetitively executed. The maximum process number Nmax used here is a fixed value which is set in advance, and is stored in the EEPROM 102. As described above, the temporary position Xt calculated in Step S306 is slightly shifted from the actual position. Therefore, in the correction using the temporary position Xt, the correction precision becomes worse by an amount corresponding to the position shift of the temporary position Xt. Then, the maximum process number Nmax is set to the larger value, and the processing of Steps S307 to S312 (second process) is repetitively executed to recalculate the temporary position Xt. In this way, the precision of obtaining the temporary position Xt can be enhanced.

On the other hand, when it is determined in Step S313 that the process number N is equal to or larger than the maximum process number Nmax, in Step S314, the position X is set as the position Xt.

Figure 9:
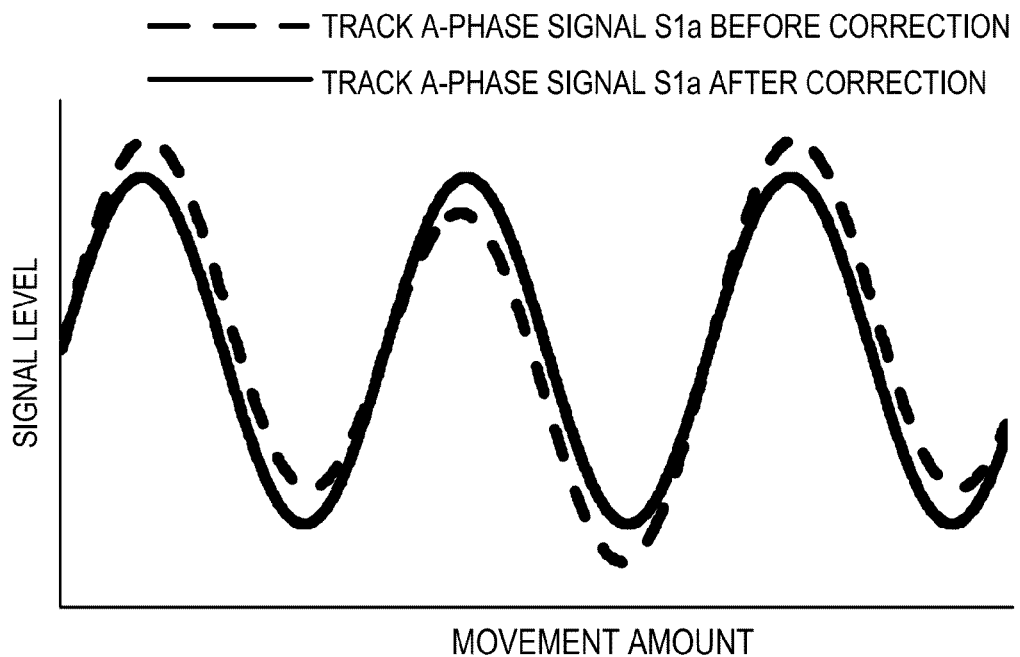
FIG. 9 is a graph showing an example of a first track phase-A signal before correction and the first track phase-A signal after the correction.
Figure 10:
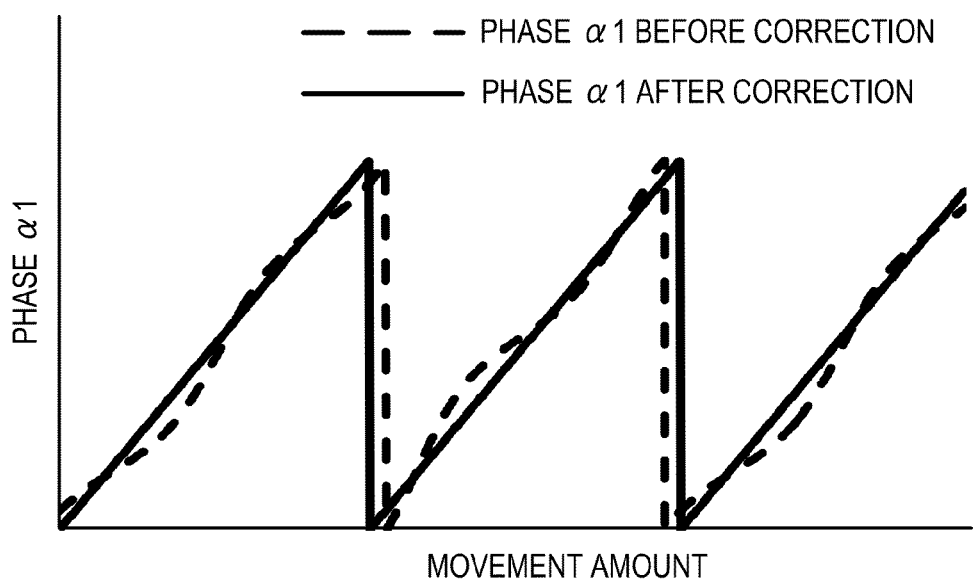
FIG. 10 is a graph showing an example of a phase $\alpha 1$ before the correction and the phase $\alpha 1$ after the correction.

The effects of the present invention are described. FIG. 9 is a graph showing a relationship between the first track phase-A signal S1a before the correction obtained from the AD converter 105 and the first track phase-A signal S1A after the correction, and the movement amount. FIG. 10 is a graph showing the phase α1 calculated from the first track phase-A signal S1*a* and the first track phase-B signal S1*b*, and the phase α1 calculated from the first track phase-A signal S1A and the first track phase-B signal S1B after the correction.

A waveform of the first track phase-A signal S1*a* before the correction is distorted and thus does not become a sine wave because the second track signal component cannot be perfectly removed in principle by the spatial filter. The first track phase-B signal S1*b* before the correction is also distorted. Thus, if the phase α1 is calculated by using the first track phase-A signal S1*a* and the first track phase-B signal S1*b* before the correction, as shown in FIG. 10, a large error occurs in the phase α1. When the position X is calculated by using the counter value C and the phase α1, the detection precision of the position is reduced because the error of the phase α1 directly becomes an error of the position X.

On the other hand, the correction processing for removing the unnecessary signal components which were not able to be perfectly removed away by the spatial filter in principle and due to the error of the sensor is executed as in the first embodiment. In this way, the error of the phase as described above can be greatly reduced, and thus the detection precision of the position can be enhanced.

In addition, in the position detection processing 2, as illustrated in Step S307, the phase α2 is calculated without using the second track phase-A signal S2*a* and the second track phase-B signal S2*b*. Like the position detection processing 1, the phase α2 can be calculated by obtaining the second track phase-A signal S2*a* and the second track phase-B signal S2*b*. In this case, however, the track switching processing, the waiting processing, and the AD conversion processing for the second track phase-A signal S2*a* and the second track phase-B signal S2*b* are required, and hence the processing time becomes longer. In addition, if the counter is configured in the form of the hardware as in the first embodiment, the counting operation may not be carried out successfully due to the track switching, but the unexpected counter value may be output. Like the first embodiment, the phase α2 is calculated, to thereby enable the position X to be calculated in a short time. Further, even when the counter is configured in the form of the hardware, no problem is caused.

Moreover, in the first embodiment, the processing of Steps S307 to S312 can be repetitively executed a plurality of times, and hence the correction precision can be enhanced.

Note that, although in the first embodiment, the description has been rendered by exemplifying the encoder for detecting the rectilinear movement, the same effects can be obtained even with an encoder for detecting rotation drive as long as a plurality of track signals are separated from one another by using the principles of the spatial filter.

In addition, in the first embodiment, the position detecting apparatus has been exemplified which receives the reflected light from the pattern fixed to the fixed member and exhibiting the different reflectivities, to thereby detect the light quantity (energy intensity) of the reflected light based on the pattern by the optical encoder. However, the present invention is by no means limited to this structure. For example, the same effects are obtained even with a position detecting apparatus using a magnetic encoder, a capacitive encoder, or the like. In the case of the magnetic encoder, a magnetic material is used in the scale section 202, and a pattern of a polar distribution of the magnetism is formed in the same shape as that of the reflecting film of the scale section 202 in the first embodiment. Magnetic field detecting elements are arranged in an array to be close to the scale section, to thereby detect the magnetic field (energy intensity) based on the scale section.

On the other hand, in the case of the capacitive encoder, it is only necessary that a conductive electrode pattern is formed in the same shape as that of the scale reflecting film in the first embodiment, and another array electrode pattern is made to closely face the conductive electrode pattern, to thereby detect the electrostatic capacitance (energy intensity) based on the electrode pattern of the scale section.

Second Embodiment

Figure 11:
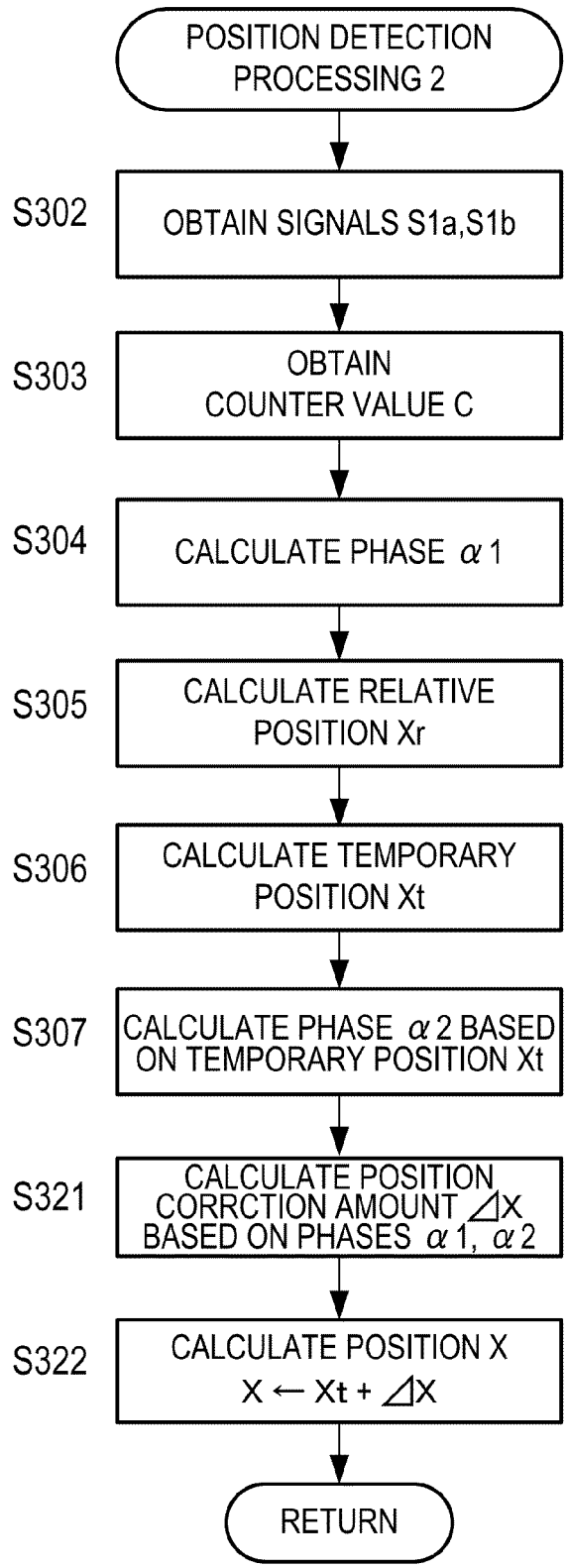
FIG. 11 is a flow chart of position detection processing 2 of the second embodiment.

Hereinafter, a position detecting apparatus according to a second embodiment of the present invention is described with reference to FIG. 11.

The second embodiment is different from the first embodiment only in the processing contents of the position detection processing 2 and is identical in other configurations and processing to the first embodiment, and hence any of descriptions other than the description of the position detection processing 2 is omitted here.

The position detection processing 2 in the second embodiment is described. FIG. 11 is a flow chart illustrating the position detection processing 2 in the second embodiment.

Processing of Steps S302 to S307 is the same as that in the first embodiment, and thus the phase α1, the temporary position Xt, and the phase α2 are calculated in order. Next, the processing proceeds to Step S321, and a position correction amount ΔX is calculated by using the phase α1 and the phase α2. The position correction amount ΔX means a correction amount with which the temporary position Xt as the position calculated from the signal containing the unnecessary signal components which have not been perfectly removed away by the spatial filter in principle and due to the error of the sensor is directly corrected. The position correction amount ΔX is calculated by using Expression (9):

$$\Delta X = f(\alpha 1, \alpha 2) \quad (9)$$

A function f(x, y) is a function determined based on ηa12, ηb12, γ12, and γb12. If the function f(x, y) is strictly determined, the function f(x, y) becomes a very complicated expression, and a calculation time becomes long. For this reason, in the second embodiment, the function f(x, y) is calculated by using two-dimensional table data in which the phase α1 and the phase α2 are set as input parameters, and the table data is stored in the EEPROM 102 in advance. The table data may be theoretically obtained from ηa12, ηb12, γa12, and γb12, or may be actually measured. When the table data is actually measured, a difference between the temporary position Xt calculated in Step S306 and the position X calculated by increasing the maximum process number Nmax is obtained by using the position detection processing 2 of the first embodiment illustrated in FIG. 3 only in the measurement, to thereby enable the table data to be obtained.

Note that, although in the second embodiment, Step S321 adopts the calculation using the two-dimensional table data, the present invention is by no means limited thereto, and calculation using an approximate expression may also be adopted.

Finally, in Step S322, the position X is calculated by adding the position correction value ΔX calculated in Step S321 to the temporary position Xt calculated in Step S306.

By executing the processing as described above, the same effects as those in the first embodiment are obtained, and the processing of Steps S308 to S311, which is executed in the first embodiment, need not be executed. In particular, the processing of Steps S308 and S309 includes the processing such as the multiplication, the division, cos calculation, and the arctan calculation, which requires the long processing time, and hence in the second embodiment, the processing time can be effectively shortened. In addition, when the table data used in Step S321 is produced, it is premised that the phase α1 and the phase α2 as the inputs are input as the shifted values. In this way, even if the correction processing is not repetitively executed a plurality of times unlike the first embodiment, the high-precision position can be calculated.

Third Embodiment

Figure 12:
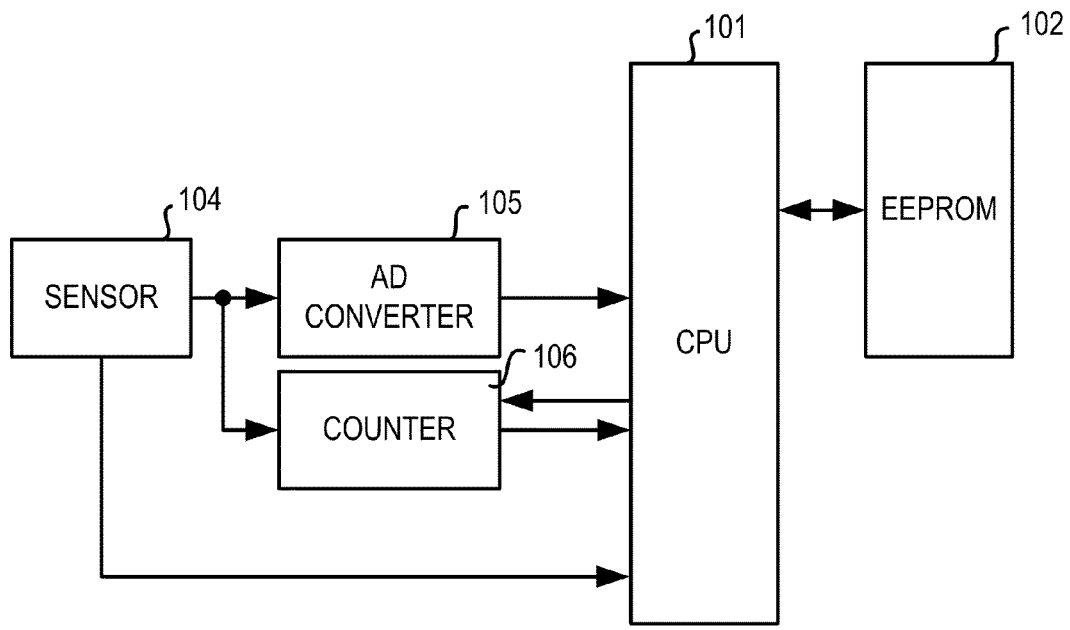
FIG. 12 is a block diagram illustrating a configuration of a position detecting apparatus according to a third embodiment of the present invention.

FIG. 12 is a block diagram illustrating a configuration of a position detecting apparatus according to a third embodiment of the present invention. The third embodiment is different in configuration from the first embodiment in that the scale switcher 103 is removed away, and in that an output signal from a photo sensor 207 to be described later can be input from the sensor 104 to the CPU 101.

Figure 13:
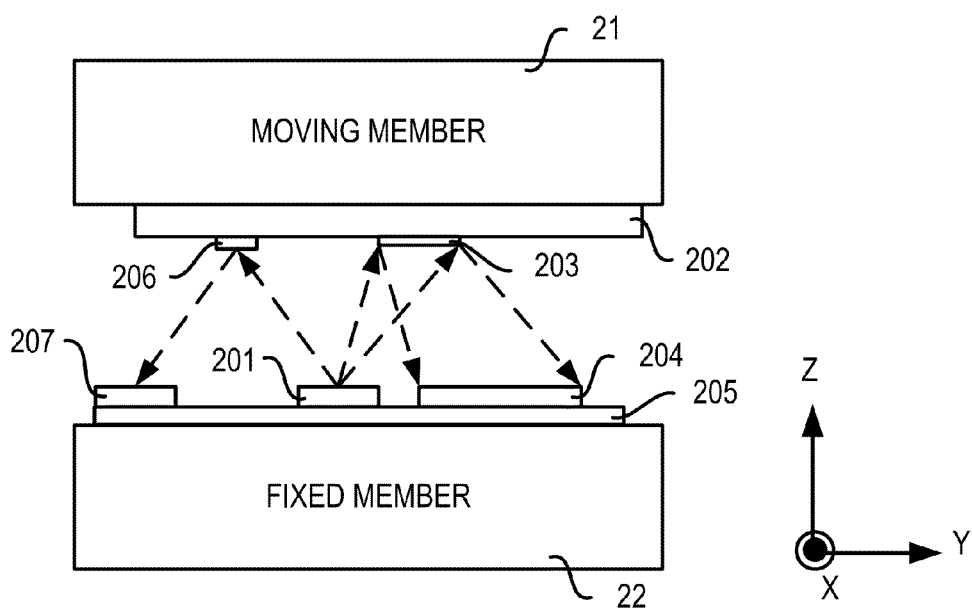
FIG. 13 is a cross-sectional view of a sensor of the third embodiment.

Next, an internal structure of and an output signal (detection signal) from the sensor 104 are described. FIG. 13 is a view illustrating the internal structure of the sensor 104 in the third embodiment. In FIG. 13, because the constituent elements 201 to 205 are the same as those in the first embodiment, a description thereof is omitted here. Note that, in the third embodiment, the signal processing circuit 205 always produces the first track phase-A signal S1a and the first track phase-B signal S1b.

A pattern 206 is a position specifying pattern with which a predetermined position is specified. The photo sensor 207 is a photo sensor for receiving the light emitted from the light source 201 and reflected by the pattern 206. The photo sensor 207 is arranged in the same position as that of the photo sensor 204 in the X-axis direction. An output signal So corresponds to binary of an H level or an L level, and can be directly input to the CPU 101.

Figure 14:
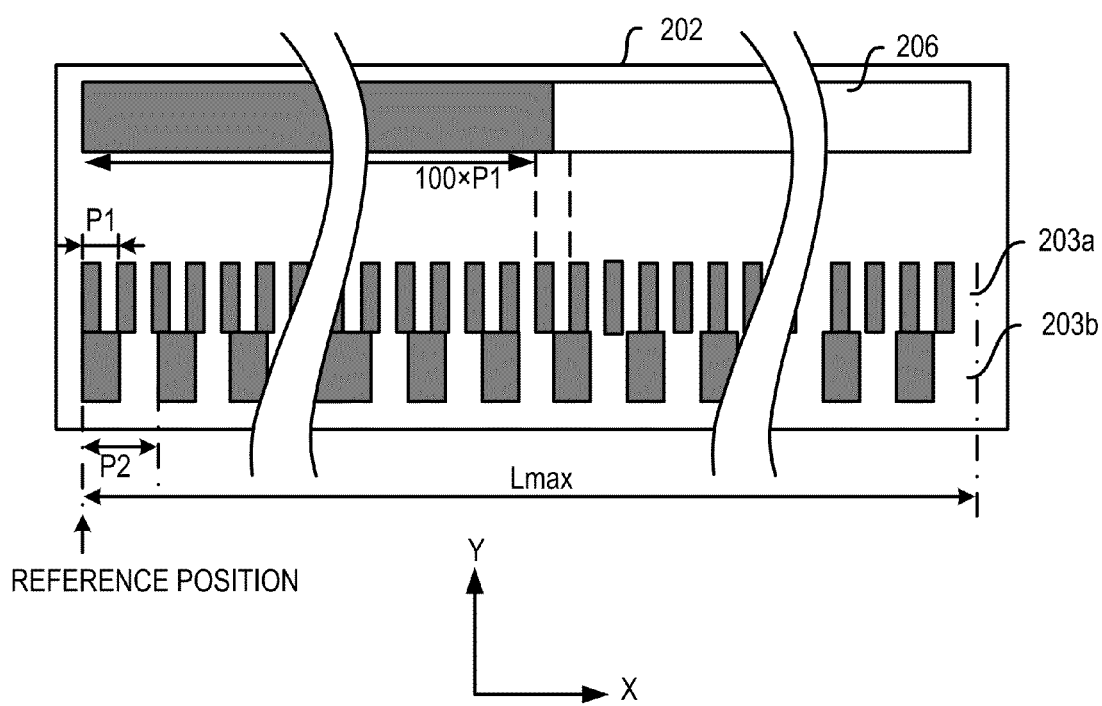
FIG. 14 is a top plan view of a scale of the third embodiment.

The pattern 206, as illustrated in FIG. 14, is a pattern which has a reflecting section only on one side from a specific one place. In the third embodiment, a boundary of the reflecting section is designed so as to be located in a position of from 100×P1 to 101×P1 from a reference position. When the output signal So from the photo sensor 207 changes, it is possible to detect that the photo sensor 204 and the photo sensor 207 are located in the position of from 100×P1 to 101×P1 from the reference position of the scale section 202.

Figure 15:
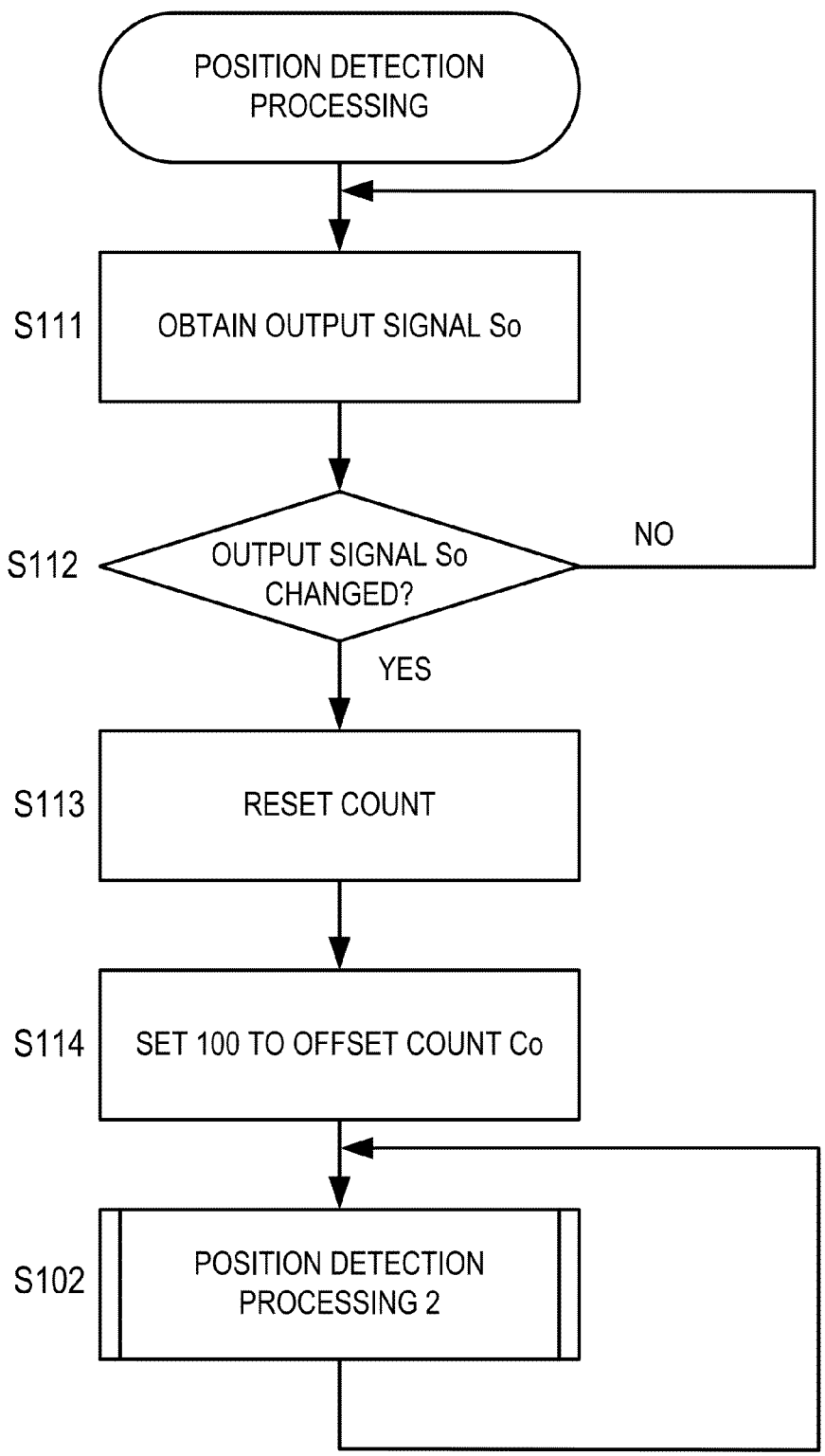
FIG. 15 is a flow chart of whole processing in a CPU of the third embodiment.

Subsequently, processing by the CPU 101 is described. FIG. 15 is a flow chart illustrating whole position detection processing executed by the CPU 101 of the third embodiment. In Steps S111 and S112, it is monitored whether or not the output signal So from the photo sensor 207 has changed, and the monitoring is continuously carried out until the output signal So from the photo sensor 207 changes. When the output signal So changes, the processing proceeds to Step S113, and the counter value of the counter 106 is reset. Then, the processing proceeds to Step S114, and an offset count Co is set to 100. Then, the processing proceeds to Step S102, the position detection processing 2 in the first embodiment or the position detection processing 2 in the second embodiment is repetitively executed.

In the third embodiment, the light source 201, the pattern 206, the photo sensor 207, the signal processing circuit 205, and the CPU 101 serve as a position specifying unit (determination unit). On the other hand, in the first and second embodiments, the first track pattern 203a, the second track pattern 203b, the photo sensor 204, the signal processing circuit 205, the CPU 101, and the scale switcher 103 serve as a position specifying unit (determination unit). Even when the scale switcher 103 provided in the first embodiment or the second embodiment is not provided as described above, the present invention can be applied if the position from the reference position can be specified by using the unit for specifying the predetermined position, such as the light source 201, the pattern 206, and the photo sensor 207.

Note that, although in the third embodiment, the light source of the light received by the photo sensor 207 is made identical to the light source of the light received by the photo sensor 204, another light source may be additionally provided.

In addition, although in the third embodiment, the origin is detected by the method using the light, the present invention is by no means limited thereto. That is, a method using the magnetism or the electrostatic capacitance may also be adopted. Further, a predetermined position may be detected by making collision with a mechanical end whose position from the reference position is determined.

The position detecting apparatus of the present invention is used as a position detecting unit for a movable optical member such as a zoom lens, a focus lens, or an iris of a lens apparatus, or a position detecting unit for a movable optical member included in a scanning optical apparatus such as an image forming apparatus (printer) or an image reading apparatus (scanner). In this way, the stable optical characteristics and the high-precision controllability can be realized through the high-precision position detection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-177548, filed on Aug. 29, 2013, which is hereby incorporated by reference herein in its entirety.

What is claimed is:
1. A position detecting apparatus, comprising:
a scale having a first pattern arranged in a predetermined direction at a first period and a second pattern arranged in the predetermined direction at a second period larger than the first period;
a detection element array having a plurality of detecting elements, each of detecting elements being arranged in the predetermined direction and detecting energy intensities based on the first pattern and the second pattern;
a generator configured to generate, based on detection signal output from the detection element array, a plurality of first signals having phases different from each other obtained based on the first pattern and a plurality of second signals having phases different from each other obtained based on the second pattern; and
a deriving unit configured to derive a position of the detection element array relative to the scale based on the plurality of first signals and the plurality of second signals,
wherein the scale is relatively movable in the predetermined direction relative to the detection element array,
wherein the deriving unit derives a reference position as a position of the detection element array relative to the scale based on the plurality of first signals and the plurality of second signals, then performs a first process in which a displacement amount of the detection element array, which relatively moved, relative to the reference position is derived based on the plurality of first signals to derive a position of the detection element array relative to the scale and then performs a second process in which a position of the detection element array relative to the scale is derived based on the position derived by the first process.

2. The position detecting apparatus according to claim 1, wherein the deriving unit, in the second process, reduces an influence of the second pattern on the plurality of first signals based on the position derived by the first process and derives a displacement amount of the detection element array relative to the reference position based on the plurality of first signals having been subject to the rejection of the influence, to thereby derive a position of the detection element array relative to the scale.

3. The position detecting apparatus according to claim 1, wherein the deriving unit, in the second process, derives a phase in the second period based on a position derived by the first process, reduces an influence of the second pattern on the plurality of first signals based on the derived phase in the second period and derives a displacement amount of the detection element array relative to the reference position based on the plurality of first signals having been subject to the rejection of the influence, to thereby derive a position of the detection element array relative to the scale.

4. The position detecting apparatus according to claim 1, wherein the deriving unit repeats the second process.

5. The position detecting apparatus according to claim 1, wherein the deriving unit, in the second process, reduces an influence affected on the plurality of first signals by the second pattern from a position derived by the first process, to thereby derive a position of the detection element array relative to the scale.

6. The position detecting apparatus according to claim 1, wherein the deriving unit, in the second process, derives a phase in the second period, reduces a value based on the derived phase in the second period, and reduces an influence affected on the plurality of first signals by the second pattern from a position derived by the first process by use of the derived value, to thereby derive a position of the detection element array relative to the scale.

7. The position detecting apparatus according to claim 1, further comprising a determination unit configured to determine a reference position of the detection element array relative to the scale based on the plurality of signals having the first period and the plurality of signals having the second period,
wherein the determination unit determines as to whether or not the plurality of first signals are signals having period within a predetermined period, and the reference position is determined when the plurality of first signals are signals having period within a predetermined period.

8. The position detecting apparatus according to claim 1, wherein:
the first pattern and the second pattern comprises a reflective slit pattern arranged at the first period and a reflective slit pattern arranged at the second period in the movement direction; and
the detection element array comprises a light receiver array which is formed on a surface facing in parallel with a surface of the slit pattern and in which a plurality of light receivers are arranged in the predetermined direction, the plurality of light receivers being configured to receive light which is emitted from a light source and reflected by the slit pattern, the light source being formed on the same surface as the surface of the detection element array and being immovable with respect to the detection element array.

9. A lens apparatus, comprising the position detecting apparatus, including:
a scale having a first pattern arranged in a predetermined direction at a first period and a second pattern arranged in the predetermined direction at a second period larger than the first period;
a detection element array having a plurality of detecting elements, each of detecting elements being arranged in the predetermined direction and detecting energy intensities based on the first pattern and the second pattern;
a generator configured to generate, based on detection signal output from the detection element array, a plurality of first signals having phases different from each other obtained based on the first pattern and a plurality of second signals having phases different from each other obtained based on the second pattern; and
a deriving unit configured to derive a position of the detection element array relative to the scale based on the plurality of first signals and the plurality of second signals,
wherein the scale is relatively movable in the predetermined direction relative to the detection element array,
wherein the deriving unit derives a reference position as a position of the detection element array relative to the scale based on the plurality of first signals and the plurality of second signals, then performs a first process in which a displacement amount of the detection element array, which relatively moved, relative to the reference position is derived based on the plurality of first signals to derive a position of the detection element array relative to the scale and then performs a second process in which a position of the detection element array relative to the scale is derived based on the position derived by the first process,
wherein the position detecting apparatus detects a position of a movable optical member.

10. An image forming apparatus, comprising a scanning optical apparatus for detecting a position of a movable optical member by a position detecting apparatus, the position detecting apparatus, comprising:
a scale having a first pattern arranged in a predetermined direction at a first period and a second pattern arranged in the predetermined direction at a second period larger than the first period;
a detection element array having a plurality of detecting elements, each of detecting elements being arranged in the predetermined direction and detecting energy intensities based on the first pattern and the second pattern;
a generator configured to generate, based on detection signal output from the detection element array, a plurality of first signals having phases different from each other obtained based on the first pattern and a plurality of second signals having phases different from each other obtained based on the second pattern; and
a deriving unit configured to derive a position of the detection element array relative to the scale based on the plurality of first signals and the plurality of second signals,
wherein the scale is relatively movable in the predetermined direction relative to the detection element array,
wherein the deriving unit derives a reference position as a position of the detection element array relative to the scale based on the plurality of first signals and the plurality of second signals, then performs a first process in which a displacement amount of the detection element array, which relatively moved, relative to the reference position is derived based on the plurality of first signals to derive a position of the detection element array relative to the scale and then performs a second process in which a position of the detection element array relative to the scale is derived based on the position derived by the first process.

11. An image reading apparatus, comprising a scanning optical apparatus for detecting a position of a movable optical member by the position detecting apparatus, the position detecting apparatus, comprising:
   a scale having a first pattern arranged in a predetermined direction at a first period and a second pattern arranged in the predetermined direction at a second period larger than the first period;
   a detection element array having a plurality of detecting elements, each of detecting elements being arranged in the predetermined direction and detecting energy intensities based on the first pattern and the second pattern;
   a generator configured to generate, based on detection signal output from the detection element array, a plurality of first signals having phases different from each other obtained based on the first pattern and a plurality of second signals having phases different from each other obtained based on the second pattern; and
   a deriving unit configured to derive a position of the detection element array relative to the scale based on the plurality of first signals and the plurality of second signals, wherein the scale is relatively movable in the predetermined direction relative to the detection element array, wherein the deriving unit derives a reference position as a position of the detection element array relative to the scale based on the plurality of first signals and the plurality of second signals, then performs a first process in which a displacement amount of the detection element array, which relatively moved, relative to the reference position is derived based on the plurality of first signals to derive a position of the detection element array relative to the scale and then performs a second process in which a position of the detection element array relative to the scale is derived based on the position derived by the first process.

* * * * *